(12) United States Patent
Zhang et al.

(10) Patent No.: US 12,368,671 B2
(45) Date of Patent: Jul. 22, 2025

(54) COMMUNICATION METHOD AND APPARATUS

(71) Applicant: HUAWEI TECHNOLOGIES CO., LTD., Guangdong (CN)

(72) Inventors: Ka Zhang, Beijing (CN); Sheng Fang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/495,885

(22) Filed: Oct. 27, 2023

(65) Prior Publication Data

US 2024/0056392 A1 Feb. 15, 2024

Related U.S. Application Data

(63) Continuation of application No. PCT/CN2022/076572, filed on Feb. 17, 2022.

(30) Foreign Application Priority Data

Apr. 30, 2021 (CN) .......................... 202110486259.1

(51) Int. Cl.
*H04L 45/741* (2022.01)
*H04L 45/42* (2022.01)
*H04L 45/50* (2022.01)

(52) U.S. Cl.
CPC ............ *H04L 45/741* (2013.01); *H04L 45/42* (2013.01); *H04L 45/50* (2013.01)

(58) Field of Classification Search
CPC .............................. H04L 45/741; H04L 45/50
See application file for complete search history.

(56) References Cited

U.S. PATENT DOCUMENTS

| 7,246,175 B1 * | 7/2007 | Tappan ................. H04L 61/251 370/392 |
| 11,425,022 B1 * | 8/2022 | Singh .................. H04L 12/4633 |
| 2015/0249593 A1 * | 9/2015 | Alvarez ................ H04L 45/124 370/241 |

(Continued)

FOREIGN PATENT DOCUMENTS

| CN | 100409646 C | 8/2008 |
| WO | 2019005935 A1 | 1/2019 |

OTHER PUBLICATIONS

Extended European Search Report issued in EP22794280.2, dated Aug. 6, 2024, 15 pages.

(Continued)

*Primary Examiner* — Caroline H Jahnige

(57) ABSTRACT

A communication method and apparatus are provided, so that packets of different services can be sent, based on a segment routing (SR) technology, on the same path specified by an SR policy. This addresses the significant limitation in the implementation of dual-stack reconstruction, and enhances communication efficiency. In the method, after receiving a first packet, a first network device forwards the first packet to a second network device based on a path specified by an SR policy. A destination endpoint specified by the SR policy is the second network device. An identifier of the destination endpoint includes a first IP address of the second network device and a second internet protocol (IP) address of the second network device.

20 Claims, 5 Drawing Sheets

(56) References Cited

U.S. PATENT DOCUMENTS

2018/0048490 A1    2/2018  Duong et al.
2022/0210050 A1*   6/2022  Hegde ................... H04L 45/20

OTHER PUBLICATIONS

Clarence Filsfils et al., RFC 8754 IPV6 Segment Routing Header (SRH), Internet Engineering Task Force (IETF), Mar. 2020, total 27 pages.
Clarence Filsfils et al, Network Programming extension: SRv6 uSID instruction draft-filsfils-spring-net-pgm-extension-srv6-usid-10, IETF, Mar. 10, 2021, total 19 pages.

* cited by examiner

COMMUNICATION METHOD AND APPARATUS

CROSS-REFERENCE TO RELATED APPLICATIONS

This application is a continuation of International Application No. PCT/CN2022/076572, filed on Feb. 17, 2022, which claims priority to Chinese Patent Application No. 202110486259.1, filed on Apr. 30, 2021. The disclosures of the aforementioned applications are hereby incorporated by reference in their entireties.

TECHNICAL FIELD

The present disclosure relates to the communication field, and in particular, to a communication method and apparatus.

BACKGROUND

Segment routing (SR) is a protocol designed based on a source routing concept to forward a packet on a network. The segment routing supports explicitly specifying, in a source node, a forwarding path for the packet between the source node and a destination node. Usually, the forwarding path (which may also be referred to as a tunnel) for transmitting the packet between the source node and the destination node may be specified based on an SR policy. A tunnel corresponding to an SR policy forwarded based on an MPLS data plane may be referred to as an SR-MPLS policy tunnel (which may also be referred to as an SR policy tunnel). A tunnel corresponding to an SR policy forwarded based on a segment routing over internet protocol version 6 (IPv6) (SRv6) data plane may be referred to as an SRv6 policy tunnel.

As an internet protocol version 4 (IPv4) network evolves to an IPV6 network, in some network scenarios, IPv4 services are deployed between different nodes on the network, and SRv6 policy tunnels are deployed on the network. The SRv6 policy tunnels cannot be directly used for the IPv4 services. During network upgrade, services need to be reconstructed. However, many types of the IPv4 services are included, and therefore reconstruction costs are high. In some other scenarios, IPv6 services cannot be used after SR-MPLS policy tunnels are deployed on the network. Consequently, a problem of service reconstruction or redeployment of the SRv6 policy tunnels also exists.

SUMMARY

Embodiments of the present disclosure provide a communication method and apparatus, so that packets of different services can be sent, based on an SR technology, on a same path indicated by an SR policy. This addresses the existing limitation in the implementation of dual-stack reconstruction, and improves communication efficiency.

The dual stack described in the present disclosure refers to a dual protocol stack. The dual-stack reconstruction or a dual-stack technology means that both an IPV4 protocol stack and an IPV6 protocol stack are enabled on a device, even if the device supports both the IPV4 protocol and the IPV6 protocol. The dual-stack technology enables the device to communicate with both an IPv4 network and an IPV6 network. For example, if the device is a router, an IPV4 address and an IPv6 address are configured on different interfaces of the router to enable the router to connect to the IPV4 network and the IPV6 network. If the device is a computer, the computer has both an IPV4 address and an IPV6 address and functions of processing both the two protocol addresses. A node supporting the dual protocol stack can communicate with both a node supporting the IPv4 protocol and a node supporting the IPV6 protocol. In a process of receiving data, a dual-stack node checks a header of a data packet after receiving the data packet. If the first field in an IPV4/IPv6 header, that is, a version number of an IP packet, is 4, the data packet is processed by an IPV4 stack. If the version number is 6, the data packet is processed by an IPV6 stack.

A first aspect of embodiments of the present disclosure provides a communication method. The method may be performed by a first network device. The first network device may be a device such as a router or a switch, or may be a part of components (such as a processor, a chip, or a chip system) in the foregoing device. In the method, after receiving a first packet, the first network device forwards the first packet to a second network device based on a path specified by an SR policy. A destination endpoint specified by the SR policy is the second network device. An identifier of the destination endpoint includes a first internet protocol (IP) address of the second network device and a second IP address of the second network device.

Based on the foregoing technical solution, the first network device may determine, based on the SR policy, a path for transmitting a packet between the first network device and the second network device, and forward the first packet to the second network device based on the path. The first IP address and the second IP address are respectively corresponding to packets of different services, so that the packets of different services may be sent, based on an SR technology, on a same path specified by the SR policy. This addresses the existing limitation in the implementation of dual-stack reconstruction, and improves communication efficiency.

It should be noted that the destination endpoint specified by the SR policy is the second network device. The identifier of the destination endpoint may indicate at least two IP addresses of the second network device. The at least two IP addresses include at least the foregoing first IP address and the foregoing second IP address. Apparently, the at least two IP addresses may further include a third IP address, a fourth IP address, and the like. This is not limited herein.

In a possible implementation of the first aspect, the SR policy includes a segment routing over internet protocol version 6 policy SRv6 policy.

Optionally, the path indicated by the SR policy is an SRv6-based path.

Based on the foregoing technical solution, in the SR technology, an internet protocol version 6 (IPv6) may be used on an SR data plane. This scenario may be referred to as segment routing over IPv6 (SRv6). In this scenario, the SR policy may be specifically an SRv6 policy. Correspondingly, in this scenario, the path indicated by the SR policy is the SRv6-based path.

In a possible implementation of the first aspect, the SR policy includes a multi-protocol label switching based segment routing policy (MPLS) SR policy.

Optionally, the path specified by the SR policy is a label switched path (LSP) switched based on an MPLS label.

Based on the foregoing technical solution, in the SR technology, multi-protocol label switching (MPLS) may be used on the SR data plane. This scenario may be referred to as segment routing over MPLS (MPLS SR or SR MPLS). In this scenario, the SR policy may be specifically an MPLS SR policy. Correspondingly, in this scenario, the path specified by the SR policy is an MPLS-based LSP.

In a possible implementation of the first aspect, a destination IP address of the first packet is an IPV4 address.

In a possible implementation of the first aspect, a destination IP address of the first packet is an IPV6 address.

Based on the foregoing technical solutions, the first network device may send packets of a plurality of different types of services to the second network device based on the path specified by the SR policy. For example, the first packet forwarded by the first network device to the second network device may be a packet of an IPV4 service. To be specific, the destination IP address of the first packet is the IPV4 address. For another example, the first packet forwarded by the first network device to the second network device may be a packet of an IPV6 service. To be specific, the destination IP address of the first packet is the IPV6 address. In addition, the destination IP address of the first packet may alternatively have another implementation. This is not limited herein.

In a possible implementation of the first aspect, in the identifier of the destination endpoint specified by the SR policy, an IP version of the first IP address is the same as an IP version of the second IP address.

For example, both the IP version of the first IP address and the IP version of the second IP address are internet protocol version 6 (IPv6). Alternatively, both the IP version of the first IP address and the IP version of the second IP address are internet protocol version 4 (IPv4).

Based on the foregoing technical solution, a service indicated by the first IP address and a service indicated by the second IP address may be both implemented based on a same IP version, so that the path determined by the SR policy may carry a plurality of types of packets of different services in a same IP version.

In a possible implementation of the first aspect, in the identifier of the destination endpoint specified by the SR policy, an IP version of the first IP address is different from an IP version of the second IP address.

For example, the IP version of the first IP address is IPV6, and the IP version of the second IP address is IPv4. Alternatively, the IP version of the first IP address is IPV4, and the IP version of the second IP address is IPV6.

Based on the foregoing technical solution, a service indicated by the first IP address and a service indicated by the second IP address may be both implemented based on different IP versions, so that the path specified by the SR policy may carry a plurality of types of packets of different services in different IP versions.

In a possible implementation of the first aspect, before the first network device forwards the first packet to the second network device based on the path specified by the SR policy, the method may further include: The first network device creates the SR policy in a static configuration manner.

In a possible implementation of the first aspect, before forwarding the first packet to the second network device based on the path specified by the SR policy, the method may further include: The first network device creates the SR policy based on a protocol message sent by a control and management device.

Based on the foregoing technical solutions, the first network device may determine the SR policy based on a configuration of the control and management device, to implement flexible configuration of a routing policy of the first network device.

In a possible implementation of the first aspect, the control and management device may include a network management system. The network management system delivers the SR policy by using a management channel.

Based on the foregoing technical solution, the network management system configures and delivers the SR policy to the first network device, so that the present disclosure may be applied to a scenario in which the network management system performs SR policy configuration on a plurality of network devices (including the first network device).

In a possible implementation of the first aspect, the network management system configures the SR policy for the first network device based on a network configuration protocol (Netconf).

In a possible implementation of the first aspect, the control and management device may include a controller.

In a possible implementation of the first aspect, when the control and management device is the controller, the first network device may create the SR policy based on the protocol message sent by the control and management device. Optionally, the foregoing protocol message may be a border gateway protocol (BGP) message.

Optionally, the BGP message includes network layer reachability information (NLRI). A subsequent address family identifier (SAFI) of the NLRI is the SR policy. The NLRI includes the first IP address. An extension type-length-value (TLV) field of the NLRI includes the second IP address. Optionally, the TLV field is an extended attribute of the NLRI.

Based on the foregoing technical solutions, the SR policy may be created by extending the BGP protocol, so that the SR policy may specify a plurality of IP addresses of the destination endpoint at the same time, and dual-stack reconstruction can be implemented without any change made to an existing service.

In a possible implementation of the first aspect, when the control and management device is the controller, the first network device may create the SR policy based on the protocol message sent by the control and management device. Optionally, the foregoing protocol message is a path computation element communication protocol (PCEP) message.

Further, the PCEP message may include a path computation initiate (PCInitiate) message or a path computation update (PCUpd) message.

Optionally, the PCEP message includes a first object and a second object. The first object is for carrying the first IP address. The second object is for carrying the second IP address.

Optionally, the first object is an endpoint (END-POINT) object.

Optionally, the second object is a newly extended object of the PCEP message, and is for carrying the second IP address.

Optionally, the PCEP message includes a first object. The first object is for carrying the first IP address and the second IP address. The second IP address is carried in an extension TLV field of the first object.

Optionally, the first object is an END-POINT object.

Based on the foregoing technical solutions, the PCEP protocol is extended, so that the first network device may create the SR policy by using a message that is transmitted based on the PCEP protocol and that is sent by the controller. The PCEP message may carry a plurality of IP addresses of the destination endpoint in the foregoing plurality of different manners. In this way, the SR policy is configured for the first network device under the PECP, and dual-stack reconstruction can be implemented without any change made to an existing service.

A second aspect of embodiments of the present disclosure provides a communication method. The method may be performed by a control and management device, or may be performed by some components (such as a processor, a chip, or a chip system) in the control and management device. In the method, the control and management device first determines a segment routing SR policy. A destination endpoint specified by the SR policy is a second network device. An identifier of the destination endpoint includes a first internet protocol (IP) address of the second network device and a second IP address of the second network device. Then, the control and management device sends the SR policy to a first network device.

Based on the foregoing technical solution, the control and management device sends the SR policy to the first network device. The SR policy may be used to determine a path for transmitting a packet between the first network device and the second network device, so that the first network device may send a first packet to the second network device based on the path. The first IP address and the second IP address are respectively corresponding to packets of different services, so that the packets of different services may be sent on a same path specified by the SR policy. This addresses the existing limitation in the implementation of dual-stack reconstruction, and improves communication efficiency.

It should be noted that the destination endpoint specified by the SR policy is the second network device. The identifier of the destination endpoint includes at least two IP addresses of the second network device. The at least two IP addresses include at least the foregoing first IP address and the second IP address. Apparently, the at least two IP addresses may further include a third IP address, a fourth IP address, and the like. This is not limited herein.

In a possible implementation of the second aspect, the SR policy includes a segment routing over internet protocol version 6 policy SRv6 policy. Optionally, the path indicated by the SR policy is an SRv6-based path.

Based on the foregoing technical solution, in an SR technology, an internet protocol version 6 (IPv6) may be used on an SR data plane. This scenario may be referred to as segment routing over IPv6 (SRv6). In this scenario, the SR policy may be specifically an SRv6 policy. Correspondingly, in this scenario, the path indicated by the SR policy is the SRv6-based path.

In a possible implementation of the second aspect, the SR policy includes a multi-protocol label switching based segment routing policy (MPLS) SR policy.

Optionally, the path specified by the SR policy is a label switched path (LSP) switched based on an MPLS label.

Based on the foregoing technical solution, in the SR technology, multi-protocol label switching (MPLS) may be used on the SR data plane. This scenario may be referred to as segment routing over MPLS (MPLS SR or SR MPLS). In this scenario, the SR policy may be specifically an MPLS SR policy. Correspondingly, in this scenario, the path specified by the SR policy is an MPLS-based LSP.

In a possible implementation of the second aspect, in the identifier of the destination endpoint specified by the SR policy, an IP version of the first IP address is the same as an IP version of the second IP address.

For example, both the IP version of the first IP address and the IP version of the second IP address are internet protocol version 6 (IPv6). Alternatively, both the IP version of the first IP address and the IP version of the second IP address are internet protocol version 4 (IPv4).

Based on the foregoing technical solution, a service indicated by the first IP address and a service indicated by the second IP address may be both implemented based on a same IP version, so that the path determined by the SR policy may carry a plurality of types of packets of different services in a same IP version.

In a possible implementation of the second aspect, in the identifier of the destination endpoint specified by the SR policy, an IP version of the first IP address is different from an IP version of the second IP address.

For example, the IP version of the first IP address is IPV6, and the IP version of the second IP address is IPv4. Alternatively, the IP version of the first IP address is IPV4, and the IP version of the second IP address is IPV6.

Based on the foregoing technical solution, a service type indicated by the first IP address and a service indicated by the second IP address may be both implemented based on different IP versions, so that the path determined by the SR policy may carry a plurality of types of packets of different services in different IP versions. In addition, compared with a multi-stack implementation, this implementation avoids performing dual-stack reconstruction on the packet, and reduces reconstruction costs and dual-stack service maintenance costs.

In a possible implementation of the second aspect, the control and management device may include a network management system.

Based on the foregoing technical solution, the SR policy of the first network device may be from a configuration of the network management system, so that this implementation may be applied to a scenario in which the network management system performs routing configuration on a plurality of network devices (including the first network device).

In a possible implementation of the second aspect, the network management system may configure the SR policy for the first network device based on a network configuration protocol Netconf.

In a possible implementation of the second aspect, the control and management device may include a controller.

Based on the foregoing technical solutions, the controller delivers the SR policy, so that this implementation can be applied to a scenario in which the controller performs routing configuration on a plurality of network devices (including the first network device).

In a possible implementation of the second aspect, the controller may send the SR policy to the first network device by using a protocol message.

Optionally, the protocol message is a border gateway protocol (BGP) message.

Optionally, the BGP message includes network layer reachability information (NLRI). A subsequent address family identifier (SAFI) of the NLRI is the SR policy. The NLRI includes the first IP address. An extension type-length-value (TLV) field of the NLRI includes the second IP address.

Based on the foregoing technical solution, the BGP protocol is extended, so that the SR policy sent by the controller to the network device may include a plurality of IP addresses of the destination endpoint, to configure the SR policy for the first network device in the BGP, and guide, based on the SR policy, co-routed forwarding of different types of service packets without reconstruction of a service.

In a possible implementation of the second aspect, the protocol message is a PCEP message.

Optionally, the PCEP message may include a path computation initiate (PCInitiate) message or a path computation update (PCUpd) message.

Optionally, the PCEP message includes a first object and a second object. The first object includes the first IP address.

The second object includes the second IP address. Optionally, the first object is an endpoint (END-POINT) object.

Optionally, the second object is a newly extended object of the PCEP.

Optionally, the PCEP message includes a first object. The first object includes the first IP address and the second IP address. The second IP address is carried in an extension TLV field of the first object.

Optionally, the first object is an END-POINT object.

Based on the foregoing technical solution, the SR policy is sent to the first network device by extending the PCEP message. The PCEP message may carry the first IP address and the second IP address in the foregoing plurality of different manners, to configure the SR policy for the first network device in PECP, and guide, based on the SR policy, co-routed forwarding of different types of service packets without reconstruction of a service.

A third aspect of embodiments of the present disclosure provides a communication apparatus. The communication apparatus may be a first network device. The apparatus includes a transceiver unit and a processing unit.

The transceiver unit is configured to receive a first packet.

The processing unit is configured to determine a segment routing SR policy. A destination endpoint specified by the SR policy is a second network device. An identifier of the destination endpoint includes a first internet protocol (IP) address of the second network device and a second IP address of the second network device.

The transceiver unit is further configured to forward the first packet to the second network device based on a path specified by the SR policy.

In a possible implementation of the third aspect, the first IP address is an IPV6 address, and the second IP address is an IPV4 address.

In a possible implementation of the third aspect, the path is a segment routing over internet protocol version 6 SRv6 path.

In a possible implementation of the third aspect, the path is a label switched path (LSP) switched based on a multi-protocol label switching (MPLS) label.

In a possible implementation of the third aspect, a destination IP address of the first packet is an IPV4 address.

In a possible implementation of the third aspect, a destination IP address of the first packet is an IPV6 address.

In a possible implementation of the third aspect, the processing unit is specifically configured to:
create the SR policy in a static configuration manner.

In a possible implementation of the third aspect, the processing unit is specifically configured to:
create the SR policy based on a protocol message from a control and management device.

In a possible implementation of the third aspect, the protocol message is a border gateway protocol (BGP) message.

In a possible implementation of the third aspect, the BGP message includes network layer reachability information (NLRI). A subsequent address family identifier (SAFI) of the NLRI is the SR policy. The NLRI includes the first IP address. An extension type-length-value (TLV) field of the NLRI includes the second IP address.

In a possible implementation of the third aspect,
the protocol message is a path computation element communication protocol (PCEP) message.

In a possible implementation of the third aspect,
the PCEP message includes a path computation initiate PCInitiate message or a path computation update PCUpd message.

In a possible implementation of the third aspect, an endpoint (END-POINT) object of the PCEP message includes the first IP address. An extension type-length-value (TLV) field of the END-POINT object includes the second IP address.

In a possible implementation of the third aspect, a first object of the PCEP message includes the first IP address. A second object of the PCEP message includes the second IP address.

Optionally, the PCEP message includes a first object and a second object. The first object is for carrying the first IP address. The second object is for carrying the first IP address.

Optionally, the first object is an endpoint (END-POINT) object.

Optionally, the second object is a newly extended object of the PCEP message.

Optionally, the PCEP message includes a first object. The first object includes the first IP address and the second IP address. The second IP address is carried in an extension TLV field of the first object.

Optionally, the first object is an END-POINT object.

In the third aspect of embodiments of the present disclosure, composition modules of the communication apparatus may be further configured to perform the steps performed in the possible implementations of the first aspect. For details, refer to the first aspect.

A fourth aspect of embodiments of the present disclosure provides a communication apparatus. The communication apparatus may be a control and management device, and include a processing unit and a transceiver unit.

The processing unit is used by the control and management device to determine a segment routing SR policy. A destination endpoint specified by the SR policy is a second network device. An identifier of the destination endpoint includes a first internet protocol (IP) address of the second network device and a second IP address of the second network device.

The transceiver unit is configured to send the SR policy to a first network device.

In a possible implementation of the fourth aspect,
a path specified by the SR policy is a segment routing over internet protocol version 6 policy SRv6 path.

In a possible implementation of the fourth aspect,
a path specified by the SR policy is a label switched path (LSP) switched based on a multi-protocol label switching (MPLS) label.

In a possible implementation of the fourth aspect, the first IP address is an IPV6 address, and the second IP address is an IPV4 address.

In a possible implementation of the fourth aspect, the control and management device includes a network management system.

In a possible implementation of the fourth aspect, the control and management device includes a controller.

In a possible implementation of the fourth aspect, the transceiver unit is specifically configured to:
send the SR policy to the first network device by using a protocol message.

In a possible implementation of the fourth aspect, the protocol message is a border gateway protocol (BGP) message.

In a possible implementation of the fourth aspect, the protocol message includes network layer reachability information (NLRI). A subsequent address family (SAFI) of the NLRI is the SR policy. The NLRI includes the first IP address. An extension type-length-value (TLV) field of the NLRI includes the second IP address.

In a possible implementation of the fourth aspect, the protocol message is a path computation element communication protocol (PCEP) message.

In a possible implementation of the fourth aspect, the PCEP message includes a path computation initiate (PCInitiate) message or a path computation update (PCUpd) message.

In a possible implementation of the fourth aspect, an endpoint (END-POINT) object of the PCEP message includes the first IP address. An extension type-length-value (TLV) field of the END-POINT object includes the second IP address.

In a possible implementation of the fourth aspect, a first object of the PCEP message includes the first IP address. A second object of the PCEP message includes the second IP address.

Optionally, the PCEP message includes a first object and a second object. The first object is for carrying the first IP address. The second object is for carrying the first IP address.

Optionally, the first object is an endpoint (END-POINT) object.

Optionally, the second object is a newly extended object.

Optionally, the PCEP message includes a first object. The first object includes the first IP address and the second IP address. The second IP address is carried in an extension TLV field of the first object.

Optionally, the first object is an END-POINT object.

In the fourth aspect of embodiments of the present disclosure, composition modules of the communication apparatus may be further configured to perform the steps performed in the possible implementations of the second aspect. For details, refer to the second aspect.

A fifth aspect of embodiments of the present disclosure provides a communication apparatus, including at least one processor. The at least one processor is coupled to a memory.

The memory is configured to store a program or instructions.

The at least one processor is configured to execute the program or the instructions, to enable the apparatus to implement the method according to any one of the first aspect or the possible implementations of the first aspect, or enable the apparatus to implement the method according to any one of the second aspect or the possible implementations of the second aspect.

A sixth aspect of embodiments of the present disclosure provides a computer-readable storage medium that stores one or more computer-executable instructions. When the computer-executable instructions are executed by a processor, the processor performs the method according to any one of the first aspect or the possible implementations of the first aspect.

A seventh aspect of embodiments of the present disclosure provides a computer-readable storage medium that stores one or more computer-executable instructions. When the computer-executable instructions are executed by a processor, the processor performs the method according to any one of the second aspect or the possible implementations of the second aspect.

An eighth aspect of embodiments of the present disclosure provides a computer program product (or referred to as a computer program) stored on one or more computers. When the computer program product is executed by a processor, the processor performs the method in any one of the first aspect or the possible implementations of the first aspect.

A ninth aspect of embodiments of the present disclosure provides a computer program product stored on one or more computers. When the computer program product is executed by a processor, the processor performs the method according to any one of the second aspect or the possible implementations of the second aspect.

A tenth aspect of embodiments of the present disclosure provides a chip system. The chip system includes at least one processor. The processor is configured to support a first communication apparatus in implementing the functions in any one of the first aspect or the possible implementations of the first aspect.

In an example embodiment, the chip system may further include a memory. The memory is configured to store program instructions and data that are necessary for the first communication apparatus. The chip system may include a chip, or may include a chip and another discrete component. Optionally, the chip system further includes an interface circuit. The interface circuit provides program instructions and/or data for the at least one processor.

An eleventh aspect of embodiments of the present disclosure provides a chip system. The chip system includes at least one processor. The processor is configured to support a second communication apparatus in implementing the functions in any one of the second aspect or the possible implementations of the second aspect.

In an example embodiment, the chip system may further include a memory. The memory is configured to store program instructions and data that are necessary for the second communication apparatus. The chip system may include a chip, or may include a chip and another discrete component. Optionally, the chip system further includes an interface circuit. The interface circuit provides program instructions and/or data for the at least one processor.

A twelfth aspect of embodiments of the present disclosure provides a communication system. The communication system includes the first communication apparatus in the third aspect and the second communication apparatus in the fourth aspect, and/or the communication system includes the first communication apparatus in the fifth aspect, and/or the communication system includes the first communication apparatus in the sixth aspect and the second communication apparatus in the seventh aspect.

For technical effects brought by any design manner of the third aspect to the twelfth aspect, refer to technical effects brought by different implementations of the first aspect or the second aspect.

It can be learned from the foregoing technical solutions that the first network device may determine, based on the SR policy, the path for transmitting the packet between the first network device and the second network device, and forward the first packet to the second network device based on the path. The first IP address and the second IP address are respectively corresponding to the packets of different services, so that the packets of different services may be sent, based on the SR technology, on a same path specified by the SR policy. This addresses the existing limitation in the implementation of dual-stack reconstruction, and improves communication efficiency.

BRIEF DESCRIPTION OF DRAWINGS

To illustrate technical solutions in embodiments of the present invention or in the prior art more clearly, the following briefly introduces accompanying drawings required for describing embodiments or the prior art. It is clear that the accompanying drawings in the following description show merely some embodiments of the present invention, and a person of ordinary skill in the art may still derive other drawings from these accompanying drawings without creative efforts.

DESCRIPTION OF EMBODIMENTS

The following describes technical solutions in embodiments of the present invention with reference to accompanying drawings in the embodiments of the present invention. Apparently, the described embodiments are merely some rather than all of embodiments of the present invention. All other embodiments obtained by a person of ordinary skill in the art based on embodiments of the present invention without creative efforts shall fall within the protection scope of the present invention.

Descriptions such as first and second in embodiments of the present disclosure are merely used as an example and for distinguishing described objects, and there is no sequence, and do not indicate a special limitation on a quantity of devices in embodiments of the present disclosure, and shall not constitute any limitation on embodiments of the present disclosure. In addition, terms such as "include" and "have" and any other variants thereof are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. "Embodiments" mentioned herein indicates that a particular feature, structure or characteristic that is described with reference to embodiments may be included in at least one embodiment of the present disclosure. The phrase appearing at various locations in this specification does not necessarily refer to a same embodiment, and is not an independent or alternative embodiment mutually exclusive to another embodiment. It is explicitly and implicitly understood by a person skilled in the art that embodiments described herein may be combined with other embodiments.

It should be noted that in the present disclosure, terms such as "example" or "for example" are used to represent giving an example, an illustration, or a description. Any embodiment or design scheme described as an "example" or "for example" in the present disclosure should not be interpreted as being more preferred or advantageous than another embodiment or design scheme. Exactly, use of the terms "example", "for example", or the like is intended to present a related concept in a specific manner.

Figure 1:
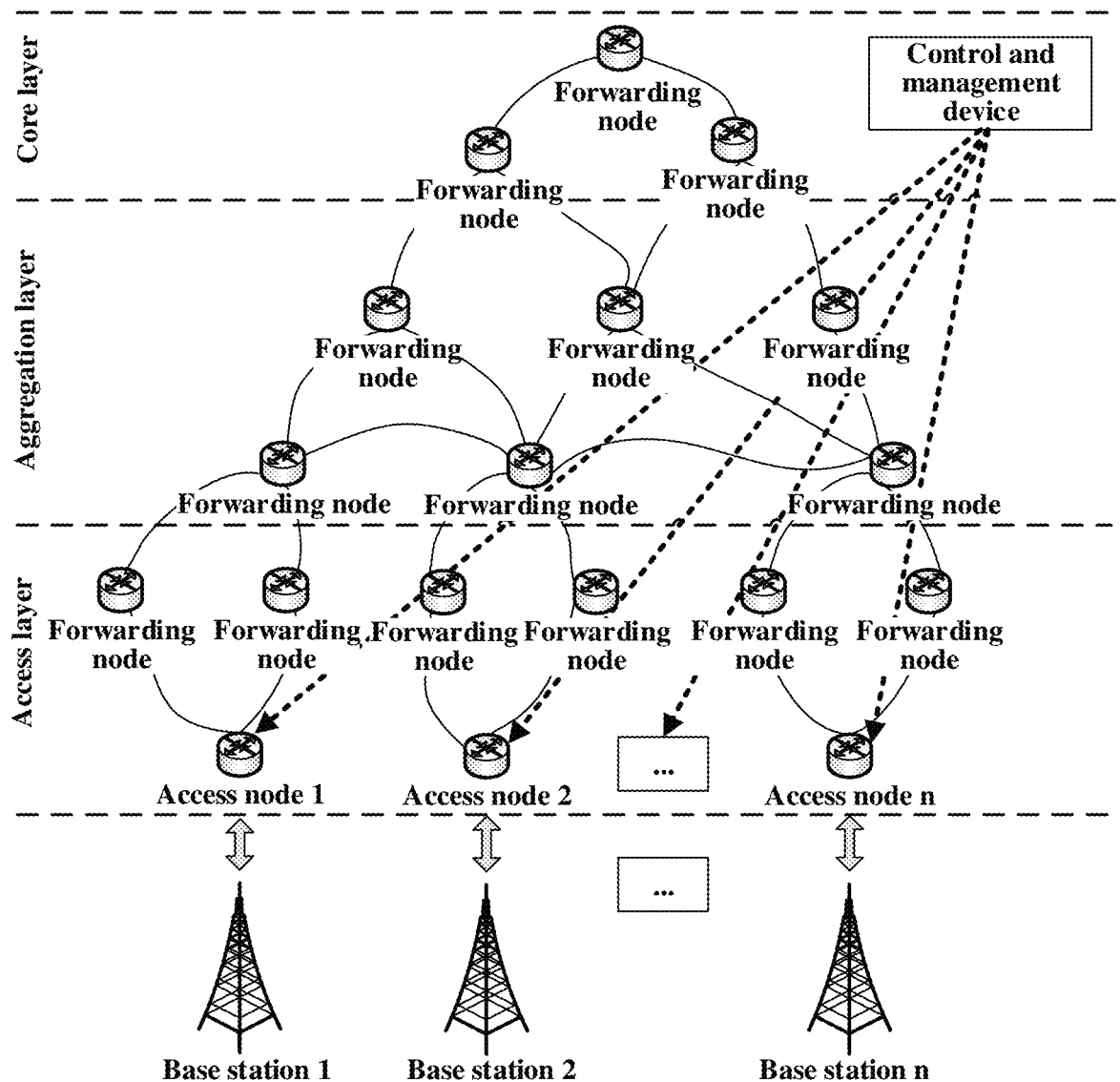
FIG. 1 is a schematic diagram of a network architecture according to an embodiment of the present disclosure.

FIG. 1 is a schematic diagram of a network architecture according to an embodiment of the present disclosure.

As shown in FIG. 1, the network architecture includes at least a core layer, an aggregation layer, and an access layer. Different network layers each include a plurality of nodes. The nodes may be switches, routers, virtual machines, or the like. A node that is in the access layer and that is configured to provide a network service access interface for a base station may be referred to as an access node (for example, an access node 1, an access node 2, . . . , and an access node n in the figure). Another node is referred to as a forwarding node. Generally, the forwarding node mainly bears a network forwarding function. The access node is mainly responsible for bearing network service accessing and network forwarding functions. The network architecture shown in FIG. 1 may further include a control and management device. The control and management device is mainly responsible for controlling and managing an access node in a network.

Figure 2:
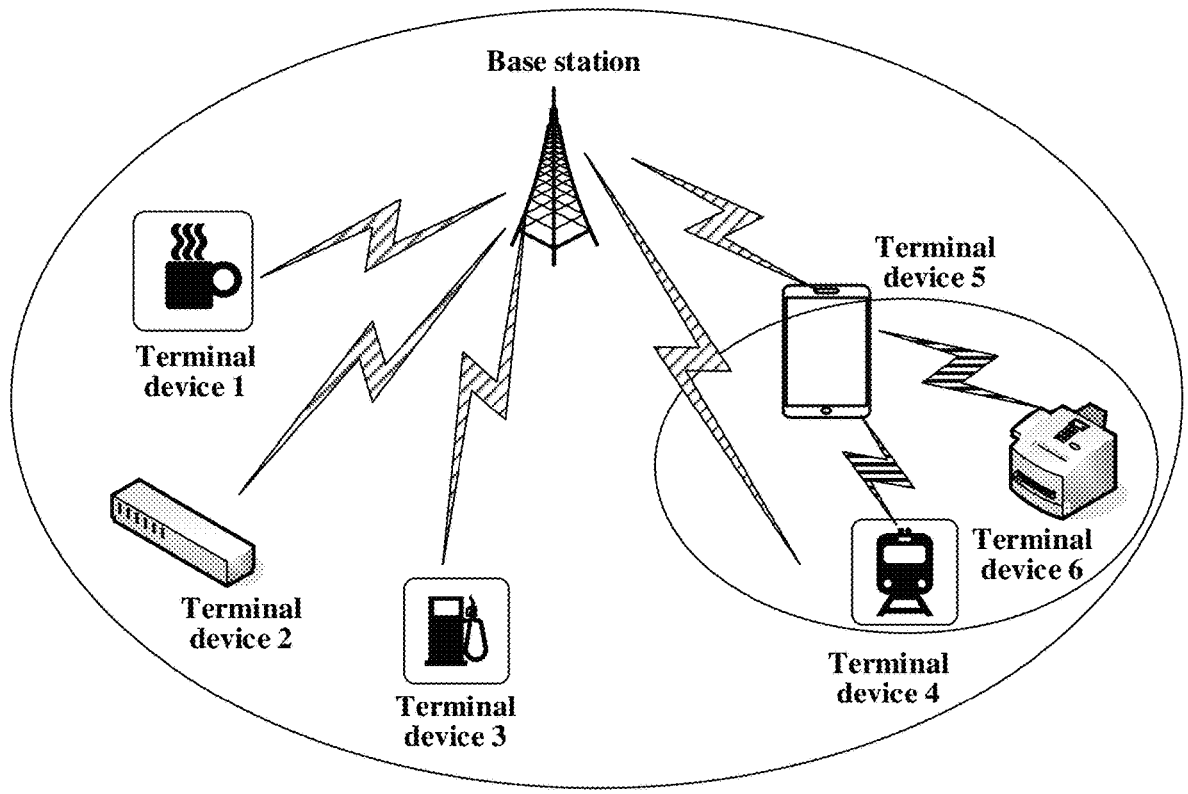
FIG. 2 is another schematic diagram of a network architecture according to an embodiment of the present disclosure.

For example, in the network architecture shown in FIG. 1, different nodes at the access layer may communicate with each other through 10 Gigabit Ethernet (GE), 50 GE, or 100 GE. Different nodes at the aggregation layer may communicate with each other through 100 GE or 200 GE. Different nodes at the core layer may communicate with each other through 400 GE. Further, as shown in FIG. 2, the base station shown in FIG. 1 may provide a network access service for a plurality of different terminal devices, so that the terminal device can access a network by using the access nodes shown in FIG. 1, to implement communication with other devices in a network system. The terminal device may include at least a terminal device 1 (smart teacup), a terminal device 2 (smart air conditioner), a terminal device 3 (smart fuel dispenser), a terminal device 4 (vehicle), a terminal device 5 (smartphone), and a terminal device 6 (printer) shown in FIG. 2. Apparently, the base station may further access another type of terminal device, for example, a personal computer (PC), such as a tablet personal computer (Tablet PC), a notebook computer, an ultra-mobile personal computer, or a personal digital assistant. This is not limited herein.

As services rapidly develop, a segment routing (SR) technology is proposed. The SR technology may be applied to communication between different nodes (for example, between an access node and a forwarding node, or between a forwarding node and a forwarding node) in the network architecture shown in FIG. 1. The SR is a protocol designed based on a source routing concept to forward a packet on a network. The segment routing supports explicitly specifying, in a source node, a forwarding path for the packet between the source node and a destination node.

In the SR technology, an internet protocol version 6 (IPv6) may be used on an SR data plane. This scenario may be referred to as segment routing over IPv6 (SRv6). In this scenario, an SR policy may be specifically an SRv6 policy.

In addition, multi-protocol label switching (MPLS) may also be used on the SR data plane. This scenario may be referred to as segment routing over MPLS (MPLS SR or SR MPLS). In this scenario, the SR policy may be specifically an MPLS SR policy.

For example, the SRv6 scenario is used as an example for description herein. The SRv6 is a protocol designed based on the source routing concept to forward an IPV6 data packet on a network. In the SRv6, hop-by-hop forwarding is implemented by inserting a segment routing header (SRH) into an IPV6 packet, inserting an explicit IPV6 address stack into the SRH, and continuously performing operations, by using a forwarding node (or referred to as an intermediate node), of updating a destination address while offsetting the address stack.

In the SRv6, the SRv6 policy uses a source routing mechanism of segment routing to encapsulate an ordered instruction list on a head node, to guide a packet to transmit through a network. The SRv6 policy uses <source endpoint, color, destination endpoint> to globally and uniquely identify one SRv6 policy. An SR policy may contain a plurality of candidate paths. Each candidate path may be associated with a plurality of segment lists. A segment list is for identifying a source routing path for sending traffic to a destination node (Endpoint) through the SRv6 policy. A weight attribute attached to the segment list is for controlling a load proportion of the traffic in a plurality of SR paths, thereby implementing equal-cost multipath (ECMP) or unequal-cost multipath (UECMP).

Specifically, in the SRv6 policy, the color is an important attribute of the SRv6 policy, and is an anchor of a service and a tunnel. The color can be associated with one or more service requirement templates, for example, low latency, bandwidth, and affinity attribute. In the SRv6 policy, paths are calculated based on the color. In addition, the service also uses the color to define network connection requirements. In this way, auto steering can be implemented by matching the service with the color of the SRv6 policy. In this way, during service deployment, only service requirements need to be defined, regardless of a tunnel definition. In this way, the service deployment and tunnel deployment are decoupled.

Generally, a forwarding path for transmitting a packet may be referred to as a tunnel. In the network architecture shown in FIG. 1, a traffic ingress node of a tunnel may be referred to as a source endpoint (or referred to as a source node or a head node). A traffic egress node of the tunnel may be referred to as a destination endpoint (or referred to as a destination node or a tail node). As shown in FIG. 1, the source node and the destination node may be, for example, the access nodes in FIG. 1. For example, when the source node is an access node 1, the access node 1 sends a packet to the forwarding node, so that the packet is forwarded by a plurality of forwarding nodes at the access layer (which may pass through the aggregation layer and the core layer), and forwarded to the destination node. The destination node may be, for example, any one or more of the access node 2 to the access node n (where n is an integer greater than 2). Different nodes may transmit a plurality of different types of IPV6 services based on the SRv6, such as L3VPN, L3EVPN, VPLS, and VPWS. When a plurality of different types of IPV6 services are transmitted between two access nodes (for example, the source node is the access node 1 and the destination node is the access node 2), transmission may be performed by using addresses of different loopback interfaces. The different IPV6 services are in a one-to-one correspondence with different loopback interfaces in the access node 2. Similarly, the source node may also transmit different IPv4 services by using addresses of different loopback interfaces in the destination node.

Figure 3A:
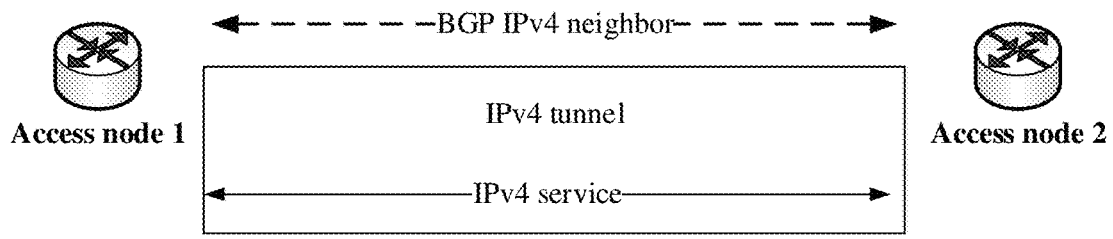
FIG. 3a is a schematic diagram of service transmission based on an IPV4 tunnel.

In the network architecture shown in FIG. 1, most services transmitted between different nodes in a current network are internet protocol version 4 (IPv4) services. For example, an example in which the access node 1 shown in FIG. 1 is used as the source node, the access node 2 is used as the destination node, and a communication process between the access node 1 and the access node 2 is applied to a scenario shown in FIG. 3a is used for description herein. In FIG. 3a, a BGP IPv4 neighbor is established between the access node 1 and the access node 2. An IPV4 service is transmitted between the access node 1 and the access node 2 by using an IPv4 tunnel.

As the SRv6 is widely used, many services on the current network need to be upgraded, so that an IPV4 service can be transmitted through an SRv6 tunnel.

Figure 3B:
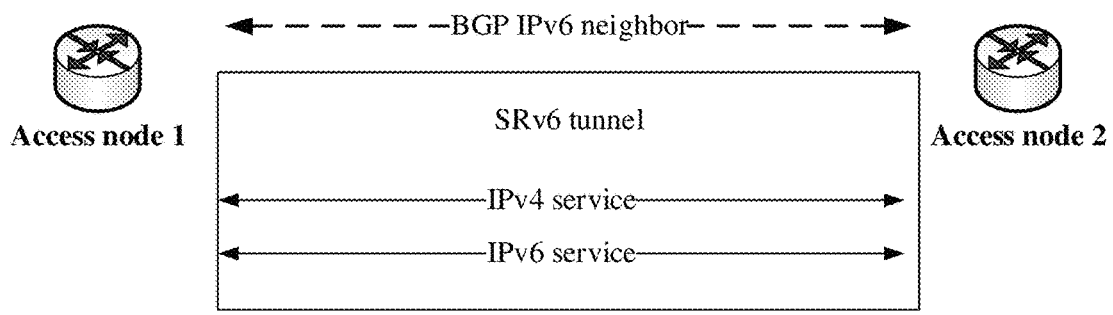
FIG. 3b is a schematic diagram of service transmission based on an SRv6 tunnel.

For example, an example in which the access node 1 shown in FIG. 1 is used as the source node, the access node 2 is used as the destination node, and a communication process between the access node 1 and the access node 2 is applied to a scenario shown in FIG. 3b is used for description herein. In FIG. 3b, a BGP IPV6 neighbor is established between the access node 1 and the access node 2. A transmission tunnel used between the access node 1 and the access node 2 is an SRv6 tunnel, so that an IPV6 service may be transmitted on the SRv6 tunnel. To enable an IPv4 service to be transmitted on the SRv6 tunnel, the BGP IPV4 neighbor between the access node 1 and the access node 2 needs to be established over the BGP IPV6 neighbor, so that the BGP IPv6 neighbor is iterated to the SRv6 tunnel. In addition, it is required to configure an IPV6 address under an IPV4 address family, so that the IPV4 service can be steered to an IPV6 tunnel.

In an implementation shown in FIG. 3b, in a process of configuring the IPV6 address under the IPV4 address family, dual-stack reconstruction needs to be performed on the IPV4 service. To be specific, an IPV6 protocol stack is deployed in the IPV4 service. This enables the IPV4 service to support dual stacks of IPV4 and IPV6. That is, the IPV4 service is supported through the IPV6 protocol stack.

Further, as shown in FIG. 3b, if a service transmitted between the access node 1 and the access node 2 includes the IPV4 service and the IPV6 service, after the dual-stack reconstruction is performed on the IPV4 service, the access node 1, the access node 2, and a forwarding node between the access node 1 and the access node 2 are all required to support dual-stack deployment capabilities, so that transmission of the IPV4 service on each node is not interrupted. In addition, if a forwarding node that does not support dual-stack deployment exists between the access node 1 and the access node 2, a new IPV4 tunnel needs to be created between the access node 1 and the access node 2, so that the IPV4 service and the IPV6 service shown in FIG. 3b are respectively transmitted through different tunnels.

It should be noted that when the IPV6 service needs to be transmitted through the IPV4 tunnel, reference may also be made to the foregoing implementation processes similar to those in FIG. 3a and FIG. 3b, and the IPV6 service is transmitted through the IPV4 tunnel in an implementation of dual-stack reconstruction.

However, the foregoing implementation of dual-stack reconstruction has great limitations in practical applications. This implementation requires that the access node 1, the access node 2, and the forwarding node located between the access node 1 and the access node 2 should all support dual-stack deployment capabilities. However, some existing nodes in the network may support only IPv4 deployment, and some nodes newly added on the network may support only IPV6 deployment. Consequently, this implementation requires tunnel resources. In addition, there are many types of IPV4 services in the current network, such as L3VPN, L3EVPN, VPLS, and VPWS. Therefore, the dual-stack reconstruction is required for all IPv4 services. This results in high dual-stack reconstruction process costs and high dual-stack coexistence maintenance costs, and is unfavorable for large-scale deployment of the solution.

Similarly, when the IPV6 service needs to be transmitted through the IPV4 tunnel, the foregoing disadvantage also exists. Therefore, how to avoid a waste of tunnel resources, high dual-stack reconstruction process costs, and high dual-stack coexistence maintenance costs in the foregoing implementation is a technical problem to be urgently resolved.

Therefore, embodiments of the present disclosure provide a communication method and apparatus, so that packets of different services can be sent in a same tunnel based on the SR technology, this addresses the existing limitation in the implementation of dual-stack reconstruction, and enhances communication efficiency.

The following describes embodiments of the present disclosure from a perspective of the method.

Figure 4:
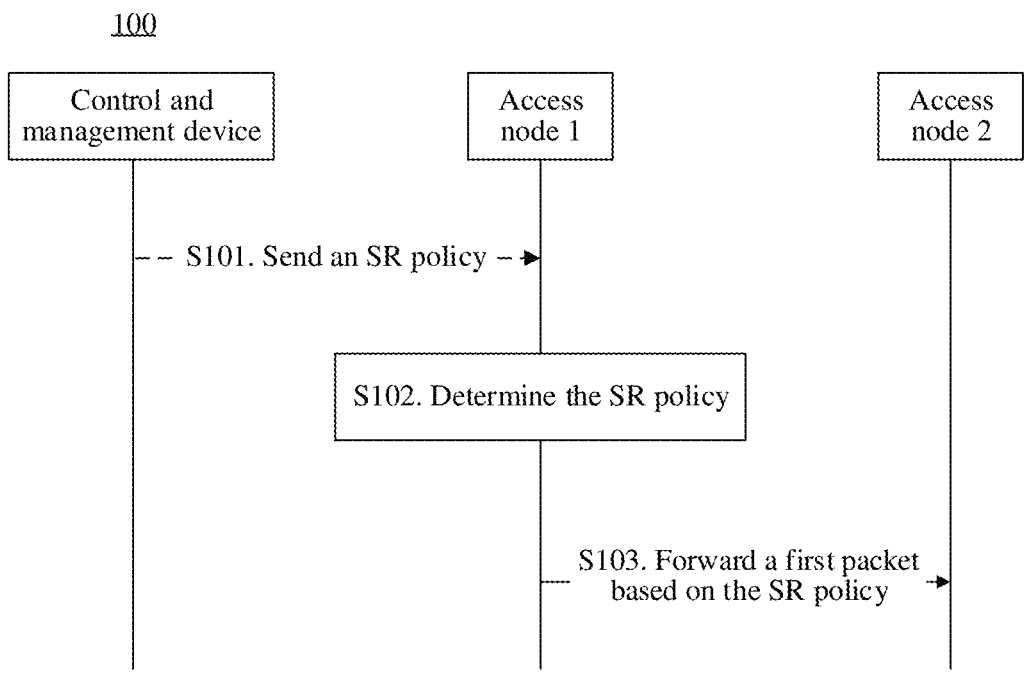
FIG. 4 is a schematic diagram of a communication method according to an embodiment of the present disclosure.

FIG. 4 is a schematic diagram of a communication method 100 according to an embodiment of the present disclosure. The method includes the following steps. The method shown in FIG. 4 may be implemented based on the network architecture shown in FIG. 1. An example in which the head node of the tunnel is the access node 1 and the tail node of the tunnel is the access node 2 is used for description.

It should be noted that in this embodiment, a tunnel may also be referred to as a path, a forwarding path, a routing path, or the like. In a subsequent embodiment, an expression of "path" is merely used as an example for description.

S101. A control and management device sends an SR policy to the access node 1.

In this embodiment, the control and management device sends the SR policy to the access node 1 in step S101. Correspondingly, the access node 1 receives the SR policy from the control and management device in step S101.

S102. The access node 1 determines the SR policy.

In this embodiment, the access node 1 determines the SR policy. Step S101 is an optional step. To be specific, when step S101 is performed, the access node 1 may determine the SR policy in a manner of communicating with the control and management device in step S101. When step S101 is not performed, the access node 1 may also determine the SR policy in another manner. For example, the access node 1 receives a message from another device to determine the SR policy, or the access node 1 determines the SR policy in a static configuration manner (for example, in a manual configuration manner in response to an operation of a user). This is not limited herein.

Specifically, a destination endpoint specified by the SR policy is a second network device. An identifier of the destination endpoint includes a first IP address of the second network device and a second IP address of the second network device. The second network device may be any one of the access node 2 to the access node n (where n is an integer greater than 2) shown in FIG. 1. In this embodiment, only an example in which the second network device is the access node 2 is used for description.

It should be noted that the identifier of the destination endpoint may further include a third IP address, a fourth IP address, and the like. This is not limited herein.

In a possible implementation, in step S101, the SR policy sent by the control and management device may include an SRv6 policy. Specifically, in an SR technology, IPv6 may be used on an SR data plane. This scenario may be referred to as SRv6. In this scenario, the SR policy may be specifically an SRv6 policy. In this implementation, a path indicated by the SR policy is an SRv6-based path.

In a possible implementation, in step S101, the SR policy sent by the control and management device may include an MPLS SR policy. Specifically, in an SR technology, MPLS may be used on an SR data plane. This scenario may be referred to as MPLS SR or SR MPLS. In this scenario, the SR policy may be specifically an MPLS SR policy. In this implementation, a path indicated by the SR policy is a label switched path (LSP) switch based on an MPLS label.

In step S101, considering that an IP version is an important attribute of an IP address, an IP version of the first IP address and an IP version of the second IP address in the identifier of the destination endpoint specified by the SR policy may be implemented in the following two manners.

Implementation 1

In step S101, in the identifier of the destination endpoint specified by the SR policy, the IP version of the first IP address is the same as the IP version of the second IP address.

For example, both the IP version of the first IP address and the IP version of the second IP address are internet protocol version 6 (IPv6). Alternatively, both the IP version of the first IP address and the IP version of the second IP address are internet protocol version 4 (IPv4).

Specifically, a service corresponding to the first IP address and a service corresponding to the second IP address may be both implemented based on a same IP version, so that the path indicated by the SR policy may carry a plurality of types of packets of different services in a same IP version. In comparison with an implementation in which different services in a same IP version are transmitted by using different loopback interface addresses, in this embodiment, different services in a same IP version may be transmitted by using a same path indicated by the SR policy.

A specific implementation of the SR policy is described herein by using Implementation 1 as an implementation example.

When an application scenario is the SRv6, the path indicated by the SR policy is an SRv6-based path. That is, the SR policy is an SRv6 policy. The current SRv6 policy may be configured by using the following fields:

Field 1: srv6-te policy 1 endpoint 1::1 color 10
Field 2: candidate-path preference 200
Field 3: segment-list s1

The "srv6-te policy" command in the field 1 is for creating a segment routing traffic engineering policy (TE Policy). The command specifies that a name value of the SRv6 policy is "1", a value of the first IP address is "1::1", and a color value is "10", and enters an SRv6 TE policy view. The "candidate-path preference" command in the field 2 is for configuring a candidate path of an SRv6 TE policy, and configuring a preference value of the candidate path to be "200". The "segment-list" command in the field 3 is for configuring a value of a segment list referenced by the candidate path of the SRv6 TE policy to be "s1".

In step S101, the current SRv6 policy may be optimized, so that in addition to the first IP address, the SRv6 policy may further include the second IP address. Another address (that is, a second destination address) of the IPV6 may be configured in the SRv6 policy, so that the SRv6 policy may be configured by using the following fields:

Field 1: srv6-te policy 1 endpoint 1::1 color 10
    Field x: ipv6-endpoint F::F
    Field 2: candidate-path preference 200
    Field 3: segment-list s1

For an implementation of the field 1, the field 2, and the field 3, refer to the configuration of the foregoing current SRv6 policy. A difference lies in that the field x may be added to the SRv6 policy. "ipv6-endpoint" is for specifying another IPv6-type destination address (that is, the second destination address) of the SRv6 TE policy. For example, a value of the second destination address is "F::F".

Therefore, a dual-stack SRv6 policy can be accessed in two manners of <1::1, 10> and <F::F, 10> (where "10" is the color value). For an IPV6 service of a specific type, a next hop (that is, a neighbor of the IPV6 service) is an IPV6 address. When the next hop matches the IPV6 destination address "1::1" in the SRv6 policy, the IPV6 service can be steered to the SRv6-based path. For an IPV6 service of another type, a next hop is an IPV6 address. When the next hop matches the IPV6 destination address "F::F" in the SRv6 policy, the IPV6 service can be steered to the SRv6-based path.

When an application scenario is the SR MPLS, the path specified by the SR policy is an LSP switched based on an MPLS label. That is, the SR policy is an MPLS SR policy. The current MPLS SR policy may be configured by using the following fields:

Field 1: sr-te policy 1 endpoint 1::1 color 10
    Field 2: candidate-path preference 200
    Field 3: segment-list s1

The "sr-te policy" command in the field 1 is for creating an SR TE policy. The command specifies that a name value of the MPLS SR policy is "1", a value of the first IP address is "1::1", and a color value is "10", and enters an MPLS SR policy view. The "candidate-path preference" command in the field 2 is for configuring a candidate path of the sr-te policy, and configuring a preference value of the candidate path to be "200". The "segment-list" command in the field 3 is for configuring a value of a segment list referenced by the candidate path of the MPLS SR policy to be "s1".

In step S101, the current MPLS SR policy may be optimized, so that in addition to the first IP address, the MPLS SR policy may further include the second IP address. Another IPv4 address (that is, the second destination address) may be configured in the MPLS SR policy, so that the MPLS SR policy may be configured by using the following fields:

Field 1: sr-te policy 1 endpoint 1.1.1.1 color 10
    Field y: ipv6-endpoint 1.1.1.0
    Field 2: candidate-path preference 200
    Field 3: segment-list s1

For an implementation of the field 1, the field 2, and the field 3, refer to the configuration of the foregoing current MPLS SR policy. A difference lies in that the field y may be added to the MPLS SR policy. "ipv4-endpoint" is for specifying another IPv6-type address (that is, the second destination address) of the SR TE policy. For example, a value of the second destination address is "1.1.1.0".

Therefore, a dual-stack MPLS SR policy can be accessed in two manners of <1.1.1.1, 10> and <1.1.1.0, 10> (where "10" is the color value). For an IPV4 service of a specific type, a next hop (that is, a neighbor of the IPV4 service) is an IPV4 address. When the next hop matches the IPV4 destination address "1.1.1.1" in the SRv6 policy, the IPv4 service can be steered to the LSP switched based on the MPLS label. For an IPV4 service of another type, a next hop is an IPV4 address. When the next hop matches the IPV6 destination address "1.1.1.0" in the SRv6 policy, the IPv4 service can be steered to the LSP switched based on the MPLS label.

Implementation 2

In step S101, in the SR policy sent by the control and management device, the IP version of the first IP address is different from the IP version of the second IP address.

For example, the IP version of the first IP address is IPV6, and the IP version of the second IP address is IPV4. Alternatively, the IP version of the first IP address is IPV4, and the IP version of the second IP address is IPV6.

Specifically, a service type corresponding to the first IP address and a service type corresponding to the second IP address may be implemented based on different IP versions, so that the path determined by the SR policy may carry a plurality of packets of different service types in different IP versions. In addition, compared with an implementation of dual-stack reconstruction, this implementation can avoid performing dual-stack reconstruction on the packet, and reduce dual-stack reconstruction costs and dual-stack service maintenance costs.

A specific implementation of the SR policy is described herein by using Implementation 2 as an implementation example.

When an application scenario is the SRv6, the path indicated by the SR policy is an SRv6-based path. That is, the SR policy is an SRv6 policy. The current SRv6 policy may be configured by using the following fields:

Field 1: srv6-te policy 1 endpoint 1::1 color 10
    Field 2: candidate-path preference 200
    Field 3: segment-list s1

The "srv6-te policy" command in the field 1 is for creating a segment routing traffic engineering policy (SR TE Policy). The command specifies that a name value of the SRv6 policy is "1", a value of the first IP address is "1::1", and a color value is "10", and enters an SRv6 TE policy view. The "candidate-path preference" command in the field 2 is for configuring a candidate path of an SRv6 TE policy, and configuring a preference value of the candidate path to be "200". The "segment-list" command in the field 3 is for configuring a value of a segment list referenced by the candidate path of the SRv6 TE policy to be "s1".

In step S101, the current SRv6 policy may be optimized, so that in addition to the first IP address, the SRv6 policy may further include the second IP address. A second destination address of the IPV4 may be configured in the SRv6 policy, so that the SRv6 policy may be configured by using the following fields:

Field 1: srv6-te policy 1 endpoint 1::1 color 10
    Field x: ipv4-endpoint 1.1.1.1
    Field 2: candidate-path preference 200
    Field 3: segment-list s1

For an implementation of the field 1, the field 2, and the field 3, refer to the configuration of the foregoing current SRv6 policy. A difference lies in that the field x may be added to the SRv6 policy. "ipv4-endpoint" is for specifying an IPV4-type second destination address of the SRv6 TE policy. For example, a value of the second destination address is "1.1.1.1".

Therefore, a dual-stack SRv6 policy can be accessed in two manners of <1::1, 10> and <1.1.1.1, 10> (where "10" is the color value). For an IPV4 service, a next hop (that is, a neighbor of the IPV4 service) is an IPV4 address. When the next hop matches the IPV4 destination address 1.1.1.1 in the SRv6 policy, the IPV4 service can be steered to the SRv6-based path. For an IPV6 service, a next hop (that is, a neighbor of the IPV6 service) is an IPV6 address. When the next hop matches the IPV6 destination address "1::1" in the SRv6 policy, the IPV6 service can be steered to the SRv6-based path.

When an application scenario is the SR MPLS, the path specified by the SR policy is an LSP switched based on an MPLS label. That is, the SR policy is an MPLS SR policy. The current MPLS SR policy may be configured by using the following fields:

Field 1: sr-te policy 1 endpoint 1::1 color 10
Field 2: candidate-path preference 200
Field 3: segment-list s1

The "sr-te policy" command in the field 1 is for creating an SR TE policy. The command specifies that a name value of the MPLS SR policy is "1", a value of the first IP address is "1::1", and a color value is "10", and enters an MPLS SR policy view. The "candidate-path preference" command in the field 2 is for configuring a candidate path of the sr-te policy, and configuring a preference value of the candidate path to be "200". The "segment-list" command in field 3 is for configuring a value of a segment list referenced by the candidate path of the MPLS SR policy to be "s1".

In step S101, the current MPLS SR policy may be optimized, so that, in addition to the first IP address, the MPLS SR policy may further include the second IP address. A second destination address of the IPV6 may be configured in the MPLS SR policy, so that the MPLS SR policy may be configured by using the following fields:

Field 1: sr-te policy 1 endpoint 1.1.1.1 color 10
Field y: ipv6-endpoint 1::1
Field 2: candidate-path preference 200
Field 3: segment-list s1

For an implementation of the field 1, the field 2, and the field 3, refer to the configuration of the foregoing current MPLS SR policy. A difference lies in that the field y may be added to the MPLS SR policy. "ipv6-endpoint" is for specifying an IPV6-type second destination address of the SR TE policy. For example, a value of the second destination address is "1::1".

Therefore, a dual-stack MPLS SR policy can be accessed in two manners of <1.1.1.1, 10> and <1::1, 10> (where "10" is the color value). For an IPV4 service, a next hop (that is, a neighbor of the IPV4 service) is an IPV4 address. When the next hop matches the IPV4 destination address "1.1.1.1" in the SRv6 policy, the IPv4 service can be steered to the LSP switched based on the MPLS label. For an IPV6 service, a next hop (that is, a neighbor of the IPV6 service) is an IPV6 address. When the next hop matches the IPV6 destination address "1::1" in the SRv6 policy, the IPV6 service can be steered to the LSP switched based on the MPLS label.

In addition, in step S101, there may be a plurality of device forms of the control and management device. For example, the control and management device may be specifically a network management system, a controller, or the like. This will be separately described below.

In a possible implementation, in step S101, when the control and management device is a network management system, the SR policy of the access node 1 may be from a configuration of the network management system, so that this implementation may be applied to a scenario in which the network management system performs route configuration on a plurality of network devices (including the access node 1).

Specifically, the network management system may configure the SR policy for the network devices based on a Netconf protocol.

In a possible implementation, in step S101, when the control and management device is a controller, the controller sends the SR policy, so that this implementation may be applied to a scenario in which the controller performs route configuration on a plurality of network devices (including the access node 1).

In a specific implementation, the controller may send the SR policy to the network devices based on a protocol message.

For example, the protocol message is a border gateway protocol (BGP) message. Further, the BGP message includes network layer reachability information (NLRI). A subsequent address family identifier (SAFI) of the NLRI is the SR policy. The NLRI includes the first IP address. An extension type-length-value (TLV) field of the NLRI includes the second IP address.

Figure 5:
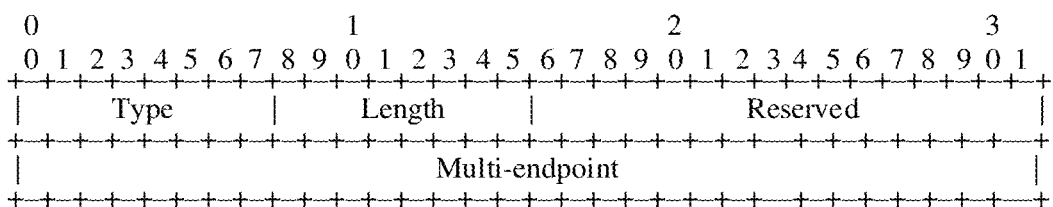
FIG. 5 is another schematic diagram of a communication method according to an embodiment of the present disclosure.

An implementation shown in FIG. 5 is used as an example. When the controller delivers the SR policy by using a BGP SR policy address family, an extensible TLV field carries the second IP address to implement a dual-stack path. In the example shown in FIG. 5, an example in which a "type" field occupies eight bytes, a "length" field occupies eight bytes, and a "value (RESERVED)" field occupies 16 bytes in the TLV field is used for description.

As shown in FIG. 5, a sub-TLV format is defined as follows:

Type field: indicates that the TLV field is for carrying an endpoint IP address.

Length field: specifies a length of a sub-TLV. If there is no address, the length is two bytes. If there is an IPV4 address, the length is six bytes. If there is an IPV6 address, the length is 18 bytes.

Multi-endpoint field: If a length is 2, no address is carried. If a length is 6, the field is an IPV4 address. If a length is 18, the field is an IPV6 address.

Generally, each sub-TLV carries only one endpoint address. To specify a plurality of endpoint addresses, a plurality of sub-TLVs can be carried.

For another example, when the control and management device is a controller, the access node 1 may create the SR policy based on a path computation element communication protocol (PCEP) message sent by the control and management device.

The PCEP message may include a path computation initiate (PCInitiate) message or a path computation update (PCUpd) message.

Optionally, the PCEP message includes a first object and a second object. The first object is for carrying the first IP address. The second object is for carrying the first IP address.

Optionally, the PCEP message includes a third object. The third object includes a first TLV field for carrying the first IP address and a second TLV field for carrying the second IP address.

Optionally, the second TLV field is an extension field.

Optionally, the first object is an endpoint (END-POINT) object.

Optionally, the second object is a newly extended object, and is for carrying an endpoint address.

Optionally, the third object is an END-POINT object.

Based on the foregoing technical solution, the access node 1 may create the SR policy by using the message that is sent by the controller and that is transmitted based on the PCEP protocol. The PCEP message may carry the first IP address and the second IP address in the foregoing plurality of different manners. In this way, the SR policy is configured for the access node 1 under the PECP. For an implementation, refer to the foregoing example shown in FIG. 5.

S103. The access node 1 forwards a first packet to the access node 2 based on the SR policy.

In this embodiment, in step S103, the access node 1 sends a packet to the access node 2 by using one or more forwarding nodes on a path indicated by the SR policy. Correspondingly, in step S103, the access node 2 receives the packet from the access node 1.

Specifically, before step S103, the access node 1 may first receive the first packet sent by another device, and then forward the first packet to the access node 2 based on the path indicated by the SR policy determined in step S102. A process in which the access node 1 receives the first packet sent by the another device may be performed before step S102 or after step S102. This is not limited herein.

In addition, the another device that sends the first packet to the access node 1 may have a plurality of possible implementations. For example, the another device may alternatively be any customer edge (CE) device, or a base station 1 connected to the access node 1 in the application scenario shown in FIG. 1, or another device that can communicate with the access node 1. This is not limited herein. When the another device needs to send the first packet to the access node 2, the access node 1 may forward the first packet based on the path indicated by the SR policy, so that the access node 2 receives the first packet, and further process the first packet (for example, the access node 2 further forwards the first packet to a base station 2 connected to the access node 2).

In a possible implementation, a destination IP address of the first packet is an IPV4 address. Alternatively, a destination IP address of the first packet is an IPV6 address.

Specifically, the access node 1 may send packets of a plurality of different types of services to the access node 2 based on the path specified by the SR policy determined in step S102. For example, the first packet forwarded by the access node 1 to the access node 2 may be a packet of an IPV4 service. To be specific, the destination IP address of the first packet is the IPv4 address. For another example, the first packet forwarded by the access node 1 to the access node 2 may be a packet of an IPV6 service. To be specific, the destination IP address of the first packet is the IPV6 address. In addition, the destination IP address of the first packet may alternatively have another implementation. This is not limited herein.

In this embodiment, the access node 1 may determine, based on the SR policy, the path for transmitting a packet between the access node 1 and the access node 2, and forward the first packet to the access node 2 based on the path. The first IP address and the second IP address are respectively corresponding to the packets of different services, so that the packets of different services may be sent, based on the SR technology, on a same path specified by the SR policy. This addresses the existing limitation in an implementation of dual-stack reconstruction, and improves communication efficiency.

Figure 6:
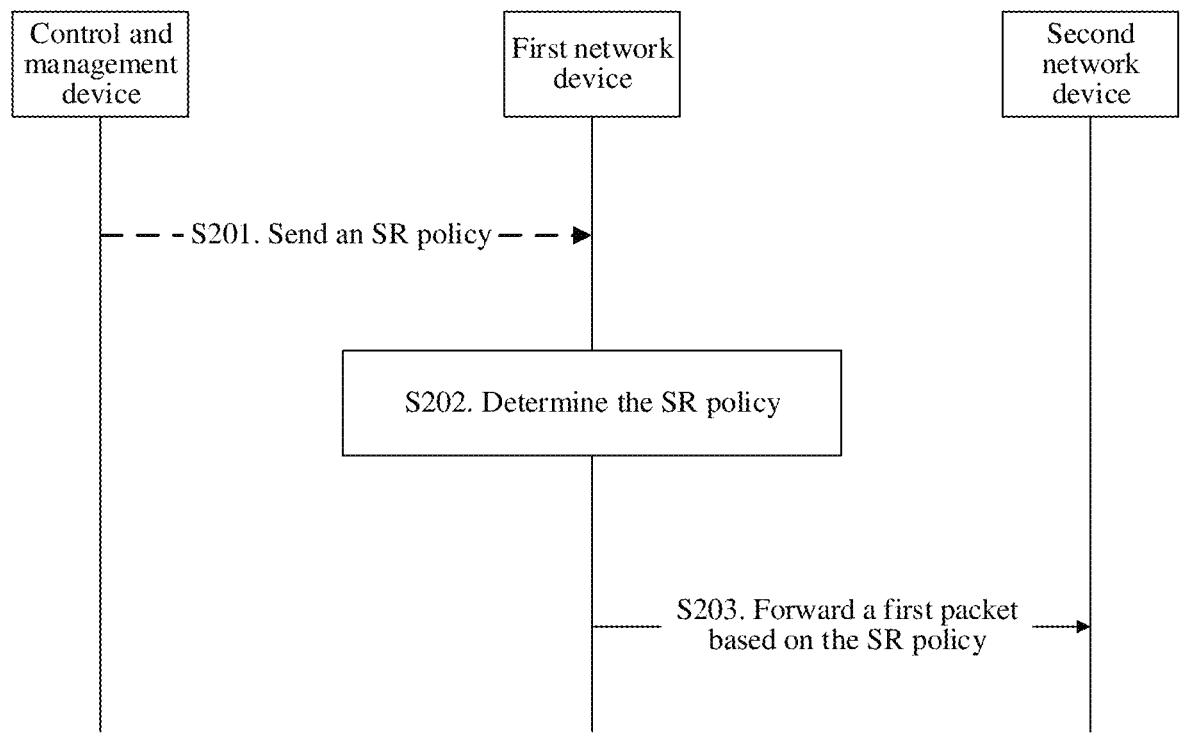
FIG. 6 is another schematic diagram of a communication method according to an embodiment of the present disclosure.

FIG. 6 is another schematic diagram of a communication method 200 according to an embodiment of the present disclosure. The method 200 may be applied to the scenarios shown in FIG. 1 and FIG. 2, to specifically implement the method 100. The method 200 includes the following steps.

S201. A control and management device sends an SR policy to a first network device.

In this embodiment, in step S201, the control and management device sends the SR policy to the first network device. Correspondingly, in step S201, the first network device receives the SR policy from the control and management device.

S202. The first network device determines the SR policy.

In this embodiment, the first network device determines the SR policy. The first network device may determine the SR policy through step S201. Alternatively, the first network device may determine the SR policy in another manner. This is not limited herein.

S202. The first network device sends a packet to a second network device based on the SR policy.

In this embodiment, in step S203, the first network device sends the packet to the second network device based on the SR policy. Correspondingly, in step S203, the second network device receives the packet from the first network device.

When the method 200 is specifically for implementing the method 100, the first network device in step S201 to step S203 may be the access node 1 in step S101 to step S103. The control and management device in step S201 to step S203 may be the control and management device in step S101 to step S103. The second network device in step S201 to step S203 may be the access node 2 in step S101 to step S103. For an implementation process, refer to the implementation of step S101 to step S103. It may be understood that the first network device and the second network device may be any access node or forwarding node in the scenario shown in FIG. 1.

The foregoing describes embodiments of the present disclosure from a method perspective, and the following describes the communication apparatus provided in embodiments of the present disclosure from an apparatus perspective.

Figure 7:
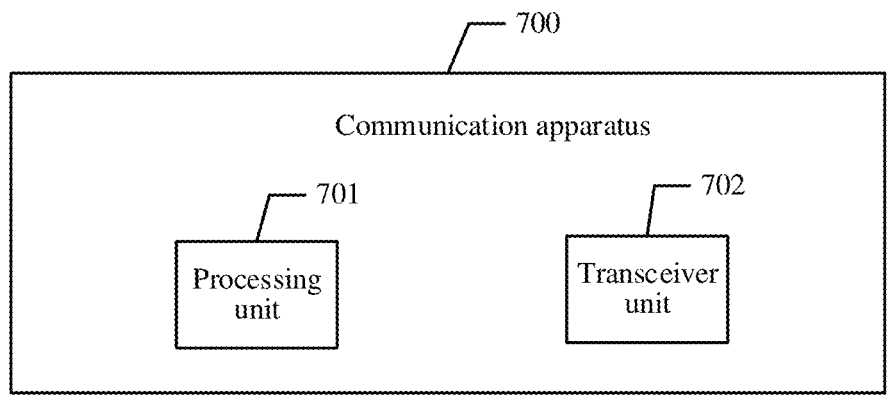
FIG. 7 is a schematic diagram of a communication apparatus according to an embodiment of the present disclosure.

Refer to FIG. 7. An embodiment of the present disclosure provides a communication apparatus. The communication apparatus 700 can implement functions of the first network device (or the access node 1) in the foregoing method embodiments, and therefore can also implement beneficial effects of the foregoing method embodiments.

The communication apparatus 700 includes a processing unit 701 and a transceiver unit 702.

The transceiver unit 702 is configured to receive a first packet.

The processing unit 701 is configured to determine a segment routing SR policy. A destination endpoint specified by the SR policy is a second network device. An identifier of the destination endpoint includes a first internet protocol (IP) address of the second network device and a second IP address of the second network device.

The transceiver unit 702 is further configured to forward the first packet to the second network device based on a path specified by the SR policy.

In a possible implementation, the first IP address is an IPV6 address, and the second IP address is an IPV4 address.

In a possible implementation,
the path is a segment routing over internet protocol version 6 SRv6 path.

In a possible implementation,
the path is a label switched path (LSP) switched based on a multi-protocol label switching (MPLS) label.

In a possible implementation, a destination IP address of the first packet is an IPV4 address.

In a possible implementation, a destination IP address of the first packet is an IPV6 address.

In a possible implementation, the processing unit 701 is specifically configured to: create the SR policy in a static configuration manner.

In a possible implementation, the processing unit 701 is specifically configured to: create the SR policy based on a protocol message from a control and management device.

In a possible implementation, the protocol message is a border gateway protocol (BGP) message.

In a possible implementation,
the BGP message includes network layer reachability information (NLRI). A subsequent address family identifier (SAFI) of the NLRI is the SR policy. The NLRI includes the first IP address. An extension type-length-value (TLV) field of the NLRI includes the second IP address.

In a possible implementation,
the protocol message is a path computation element communication protocol (PCEP) message.

In a possible implementation,
the PCEP message includes a path computation initiate (PCInitiate) message or a path computation update (PCUpd) message.

In a possible implementation, an endpoint (END-POINT) object of the PCEP message includes the first IP address. An extension type-length-value (TLV) field of the END-POINT object includes the second IP address.

In a possible implementation, a first object of the PCEP message includes the first IP address. A second object of the PCEP message includes the second IP address.

Optionally, the PCEP message includes a first object and a second object. The first object is for carrying the first IP address. The second object is for carrying the second IP address.

Optionally, the PCEP message includes a third object. The third object includes a first TLV field for carrying the first IP address and a second TLV field for carrying the second IP address.

Optionally, the second TLV field is an extension field.

Optionally, the first object is an endpoint (END-POINT) object.

Optionally, the second object is a newly extended object.

Optionally, the third object is an END-POINT object.

It should be noted that for details of contents such as an information execution process of the units of the foregoing communication apparatus 700, refer to descriptions in the foregoing method embodiments of the present disclosure.

Figure 8:
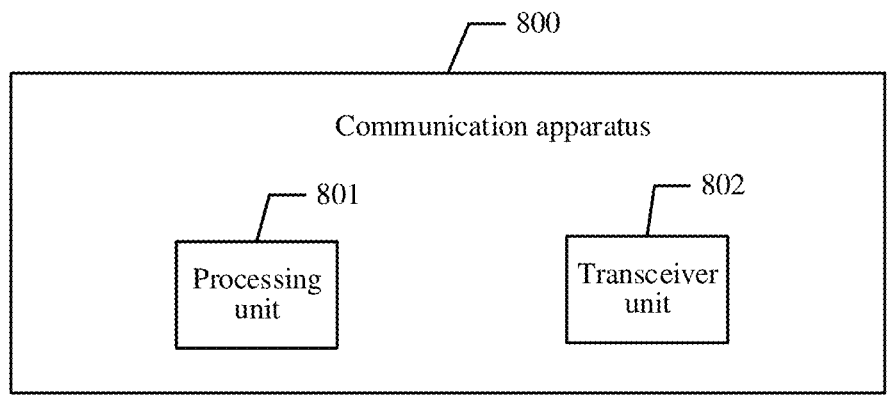
FIG. 8 is another schematic diagram of a communication apparatus according to an embodiment of the present disclosure.

Refer to FIG. 8. An embodiment of the present disclosure provides a communication apparatus. The communication apparatus 800 can implement functions of the control and management device in the foregoing method embodiments, and therefore can also implement beneficial effects of the foregoing method embodiment.

The communication apparatus 800 includes a processing unit 801 and a transceiver unit 802.

The processing unit 801 is used by the control and management device to determine a segment routing SR policy. A destination endpoint specified by the SR policy is a second network device. An identifier of the destination endpoint includes a first internet protocol (IP) address of the second network device and a second IP address of the second network device.

The transceiver unit 802 is configured to send the SR policy to a first network device.

In a possible implementation,
a path specified by the SR policy is a segment routing over internet protocol version 6 policy SRv6 path.

In a possible implementation,
a path specified by the SR policy is a label switched path (LSP) switched based on a multi-protocol label switching (MPLS) label.

In a possible implementation,
the first IP address is an IPV6 address, and the second IP address is an IPV4 address.

In a possible implementation, the control and management device includes a network management system.

In a possible implementation, the control and management device includes a controller.

In a possible implementation, the transceiver unit 802 is specifically configured to:
send the SR policy to the first network device by using a protocol message.

In a possible implementation, the protocol message is a border gateway protocol (BGP) message.

In a possible implementation, the protocol message includes network layer reachability information (NLRI). A subsequent address family (SAFI) of the NLRI is the SR policy. The NLRI includes the first IP address. An extension type-length-value (TLV) field of the NLRI includes the second IP address.

In a possible implementation, the protocol message is a path computation element communication protocol (PCEP) message.

In a possible implementation,
the PCEP message includes a path computation initiate (PCInitiate) message or a path computation update (PCUpd) message.

In a possible implementation, an endpoint (END-POINT) object of the PCEP message includes the first IP address. An extension type-length-value (TLV) field of the END-POINT object includes the second IP address.

In a possible implementation, a first object of the PCEP message includes the first IP address. A second object of the PCEP message includes the second IP address.

Optionally, the PCEP message includes a first object and a second object. The first object is for carrying the first IP address. The second object is for carrying the first IP address.

Optionally, the PCEP message includes a third object. The third object includes a first TLV field for carrying the first IP address and a second TLV field for carrying the second IP address.

Optionally, the second TLV field is an extension field.

Optionally, the first object is an endpoint (END-POINT) object.

Optionally, the second object is an END-POINT object.

Optionally, the third object is an END-POINT object.

It should be noted that for details of contents such as an information execution process of the units of the foregoing communication apparatus 800, refer to descriptions in the foregoing method embodiments of the present disclosure.

Figure 9:
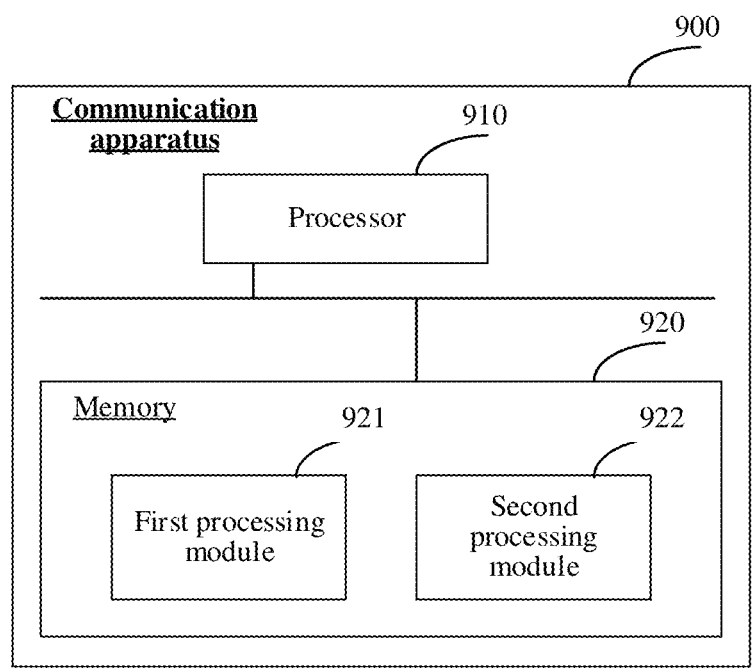
FIG. 9 is another schematic diagram of a communication apparatus according to an embodiment of the present disclosure.

In addition, an embodiment of the present disclosure further provides a communication apparatus 900. FIG. 9 is a schematic diagram of a structure of a communication apparatus 900 according to an embodiment of the present disclosure. The communication apparatus 900 may be configured to perform the methods in the foregoing embodiments. The communication apparatus 900 is configured to specifically implement a function to be implemented by the communication apparatus 700 or the communication apparatus 800.

As shown in FIG. 9, the communication apparatus 900 may include a processor 910, and a memory 920 coupled to the processor 910. The processor 910 may be a central processing unit (CPU for short), a network processor (NP for short) or a combination of a CPU and an NP. Alternatively, the processor may be an application-specific integrated circuit (ASIC for short), a programmable logic device (PLD for short) or a combination of an ASIC or a PLD. The foregoing PLD may be a complex programmable logic device (CPLD for short), a field-programmable gate array (FPGA for short), a generic array logic (GAL for short), or any combination of a CPLD, an FPGA or a GAL. The processor 910 may be one processor, or may include a plurality of processors. The memory 920 may include a volatile memory, for example, a random access memory (RAM for short). The memory may also include a non-volatile memory, for example, a read-only memory (ROM for short), a flash memory, a hard disk drive (HDD for short), or a solid-state drive (SSD for short). The memory 920 may further include a combination of the foregoing types of memories. The memory 920 may be one memory, or may include a plurality of memories. In an implementation, the memory 920 stores computer-readable instructions. The computer-readable instructions include a first processing module 921 and a second processing module 922. In this embodiment, an operation performed by a software module actually refers to an operation performed by the processor 910 based on an indication of the software module. For example, that the first processing module 921 performs "receiving a first packet" may actually mean that the processor 910 performs "receiving a first packet" based on an indication of the first processing module 921. In this case, the first processing module 921 may be corresponding to the transceiver unit 702 in the communication apparatus 700.

For a specific implementation of the communication apparatus shown in FIG. 9, refer to descriptions in the foregoing method embodiments.

An embodiment of the present disclosure further provides a computer-readable storage medium that stores one or more computer-executable instructions. When the computer-executable instructions are executed by a processor, the processor performs the method described in the possible implementations of the communication apparatus (when being implemented by a first network device) in the foregoing embodiments.

An embodiment of the present disclosure further provides a computer-readable storage medium that stores one or more computer-executable instructions. When the computer-executable instructions are executed by a processor, the processor performs the method described in the possible implementations of the communication apparatus (when being implemented by a control and management device) in the foregoing embodiments.

An embodiment of the present disclosure further provides a computer program product (or referred to as a computer program) stored on one or more computers. When the computer program product is executed by a processor, the processor performs the method in the possible implementations of the foregoing communication apparatus (when being implemented by a first network device).

An embodiment of the present disclosure further provides a computer program product stored on one or more computers. When the computer program product is executed by a processor, the processor performs the method in the possible implementations of the foregoing communication apparatus (when being implemented by a control and management device).

An embodiment of the present disclosure further provides a chip system. The chip system includes at least one processor. The processor is configured to support a first network device in implementing the function in the possible implementations of the foregoing communication apparatus (when being implemented by the first network device). Optionally, the chip system further includes an interface circuit. The interface circuit provides program instructions and/or data for the at least one processor. In an example embodiment, the chip system may further include a memory. The memory is configured to store program instructions and data that are necessary for the first network device. The chip system may include a chip, or may include a chip and another discrete component.

An embodiment of the present disclosure further provides a chip system. The chip system includes at least one processor. The processor is configured to support a control and management device in implementing the function in the possible implementations of the foregoing communication apparatus (when being implemented by the control and management device). Optionally, the chip system further includes an interface circuit. The interface circuit provides program instructions and/or data for the at least one processor. In an example embodiment, the chip system may further include a memory. The memory is configured to store program instructions and data that are necessary for the control and management device. The chip system may include a chip, or may include a chip and another discrete component. The control and management device may be specifically the control and management device in the foregoing method embodiments.

An embodiment of the present disclosure further provides a communication system. An architecture of the network system includes the communication apparatus (including the first network device and the control and management device) in any one of the foregoing embodiments.

In the several embodiments provided in the present disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The foregoing embodiments are merely used to describe the technical solutions of the present disclosure, but not to limit the technical solutions. Although the present disclosure is described in detail with reference to the foregoing embodiments, a person of ordinary skill in the art should understand that: modifications may still be made to the technical solutions described in the foregoing embodiments, or equivalent replacements may be made to the part of the technical features. However, these modifications or replacements do not cause the essence of the corresponding technical solutions to depart from the scope of the technical solutions in embodiments of the present disclosure.

What is claimed is:

1. A communication method, wherein the method is performed by a first network device, and the method comprises:
    receiving a packet; and
    forwarding the packet to a second network device based on a path specified by a segment routing (SR) policy, wherein a destination endpoint specified by the SR policy is the second network device, and an identifier of the destination endpoint comprises a first internet protocol (IP) address of the second network device and a second IP address of the second network device, wherein the first IP address and the second IP address correspond to packets of different services to be sent on the same path specified by the SR policy.

2. The method according to claim 1, wherein the first IP address is an internet protocol version 6 (IPv6) address, and the second IP address is an internet protocol version 4 (IPv4) address.

3. The method according to claim 1 wherein
the path is a segment routing over internet protocol version 6 (SRv6) path.

4. The method according to claim 1, wherein
the path is a label switched path (LSP) switched based on a multi-protocol label switching (MPLS) label.

5. The method according to claim 1, further comprising:
creating the SR policy in a static configuration manner, before forwarding the packet to the second network device based on the path specified by the SR policy.

6. The method according to claim 1, further comprising:
creating the SR policy based on a protocol message from a control and management device, before forwarding the packet to the second network device based on the path specified by the SR policy.

7. The method according to claim 6, wherein the protocol message is a border gateway protocol (BGP) message.

8. The method according to claim 7, wherein
the BGP message comprises network layer reachability information (NLRI), a subsequent address family identifier (SAFI) of the NLRI is the SR policy, the NLRI comprises the first IP address, and an extension type-length-value (TLV) field of the NLRI comprises the second IP address.

9. A communication method, wherein the method is performed by a control and management device, and the method comprises:
determining a segment routing (SR) policy, wherein a destination endpoint specified by the SR policy is a second network device, and an identifier of the destination endpoint comprises a first internet protocol (IP) address of the second network device and a second IP address of the second network device; and
sending the SR policy to a first network device,
wherein the first IP address and the second IP address correspond to packets of different services to be sent on a same path specified by the SR policy.

10. The method according to claim 9, wherein
a path specified by the SR policy is a segment routing over internet protocol version 6 (SRv6) path.

11. The method according to claim 9, wherein
a path specified by the SR policy is a label switched path (LSP) switched based on a multi-protocol label switching (MPLS) label.

12. The method according to claim 9, wherein
the first IP address is an IPV6 address, and the second IP address is an internet protocol version 4 (IPv4) address.

13. A first network device, comprising at least one processor coupled to a memory, wherein
the memory is configured to store a program or instructions that, when executed by the at least one processor, enable the first network device to:
receive a packet; and
forward the packet to a second network device based on a path specified by a segment routing (SR) policy, wherein
a destination endpoint specified by the SR policy is the second network device, and an identifier of the destination endpoint comprises a first internet protocol (IP) address of the second network device and a second IP address of the second network device,
wherein the first IP address and the second IP address correspond to packets of different services to be sent on the same path specified by the SR policy.

14. The first network device according to claim 13, wherein the first IP address is an internet protocol version 6 (IPv6) address, and the second IP address is an internet protocol version 4 (IPv4) address.

15. The first network device according to claim 13, wherein the path is a segment routing over internet protocol version 6 (SRv6) path.

16. The first network device according to claim 13, wherein
the path is a label switched path (LSP) switched based on a multi-protocol label switching (MPLS) label.

17. The first network device according to claim 13, wherein the program or the instructions, when executed by the at least one processor, further enable the first network device to:
create the SR policy based on a protocol message from a control and management device before forwarding the packet to the second network device based on the path specified by the SR policy.

18. The first network device according to claim 17, wherein the protocol message is a border gateway protocol (BGP) message.

19. The first network device according to claim 18, wherein
the BGP message comprises network layer reachability information (NLRI), a subsequent address family identifier (SAFI) of the NLRI is the SR policy, the NLRI comprises the first IP address, and an extension type-length-value (TLV) field of the NLRI comprises the second IP address.

20. The first network device according to claim 17, wherein
the protocol message is a path computation element communication protocol (PCEP) message.

* * * * *